United States Patent [19]
Kane et al.

[11] Patent Number: 5,301,554
[45] Date of Patent: Apr. 12, 1994

[54] DIFFERENTIAL PRESSURE TRANSDUCER

[75] Inventors: Robert C. Kane, Woodstock, Ill.; James E. Jaskie, Scottsdale, Ariz.

[73] Assignee: Motorola, Inc., Schaumburg, Ill.

[21] Appl. No.: 49,233

[22] Filed: Apr. 19, 1993

Related U.S. Application Data

[62] Division of Ser. No. 709,521, Jun. 3, 1991, abandoned.

[51] Int. Cl.$^5$ .................... G01L 7/08; G01L 9/00
[52] U.S. Cl. .................................. 73/717; 73/723; 313/310
[58] Field of Search ............... 73/717, 723, 753, 754; 29/595, 592.1, 593, 25.17, 25.18; 313/309, 310

[56] References Cited

U.S. PATENT DOCUMENTS 4,701,742  10/1987  Ruehr .................................. 73/717
5,163,328  11/1992  Holland et al. ................... 73/717

*Primary Examiner*—Donald O. Woodiel
*Attorney, Agent, or Firm*—Eugene A. Parsons

[57] ABSTRACT

A field emission device with an emitter on a first layer of material and an anode on a second layer of material, separated by a predetermined distance, with a sealed region therebetween. Changes in pressure external to the sealed region producing movement and consequent changes in the predetermined distance between the first and second layers, which change in distance produces a change in current between the emitter and anode. The change in current representing the change in differential pressure.

9 Claims, 3 Drawing Sheets

DIFFERENTIAL PRESSURE TRANSDUCER

This application is a division of prior application Ser. No. 07/709,521, filed Jun. 3, 1991, now abandoned.

FIELD OF THE INVENTION

This invention relates generally to pressure transducers and pressure sensing devices, and more particularly to transducer devices that provide electrical output information corresponding to external differential pressure variations.

BACKGROUND OF THE INVENTION

Differential pressure transducer devices are known in the art. Such prior art devices typically employ mechanical or semiconductor properties to translate a detected differential pressure variation into an electronic signal such as a voltage signal.

Differential pressure transducers of the prior art suffer from a number of operational restrictions. Mechanical differential pressure transducers are generally physically too large to be directly compatible with circuit integration, and are typically slow to respond to pressure variations.

Semiconductor-based differential pressure transducers may be realized in a form typically smaller than the mechanical differential pressure transducer devices. However, semiconductor-based differential pressure transducers are generally still too large to conveniently incorporate into an integrated structure. Additionally, the response time of prior art semiconductor-based differential pressure transducers is too slow for many applications.

Accordingly, there exists a need for a new differential pressure transducer which overcomes at least some of the shortcomings of the devices of the prior art.

SUMMARY OF THE INVENTION

These needs and others are substantially met through provision of the differential pressure transducer disclosed herein. Pursuant to this invention a pressure transducer device is comprised of a supporting substrate having at least a first major surface and at least a first conductive path substantially disposed on at least a part of the major surface of the supporting substrate. Further, a layer of insulating material having at least first, second, and third surfaces is disposed on at least a part of any uncovered part of the at least first major surface of the supporting substrate and further disposed on at least a part of the at least first conductive path wherein the third surface of the at least first, second, and third surfaces substantially forms a boundary around at least a first region which region is void of insulating material. Also, provided is at least a first emitter element, for emitting electrons, substantially disposed in the at least first region void of insulating material and operably coupled to the at least first conductive path and at least a second conductive path substantially disposed on the second surface of the at least first, second, and third surfaces of the at least first layer of insulating material. A flexible differential pressure detector is distally disposed with respect to the at least first emitter element and operably coupled to the at least second conductive path and further disposed such that the flexible differential pressure detector covers and forms a seal about the at least first region void of insulating material. A potential source is operably coupled to the at least first and second conductive paths. As described, the flexible differential pressure detector may translate variations in pressure differential between the exterior and the interior of the sealed device into corresponding variations in electron current due to the variation in deflection of the flexible differential pressure detector which results in a variation in proximity of the flexible differential pressure detector to the emitter element.

In one embodiment of the present invention the differential pressure transducer device functions by translating varying deflection of a flexible differential pressure detector into a variation in electron current which may be subsequently detected as a variation in a detected voltage.

In another embodiment of the present invention the differential pressure transducer device functions by translating varying deflection of a cantilevered section of a second conductive path of the differential pressure transducer into a variation in electron current which may be subsequently detected as a variation in a detected voltage.

In still another embodiment of the present invention the differential pressure transducer device functions by translating varying deflection of an area of the supporting substrate into a variation in electron current which may be subsequently detected as a variation in a detected voltage.

In further embodiments of the present invention the differential pressure transducer functions by employing combinations of some or all of the detection mechanisms of the previously described embodiments and translating the varying deflection into a variation in electron current which may be subsequently detected as a variation in a detected voltage.

DETAILED DESCRIPTION OF A PREFERRED EMBODIMENT

Figure 1A:
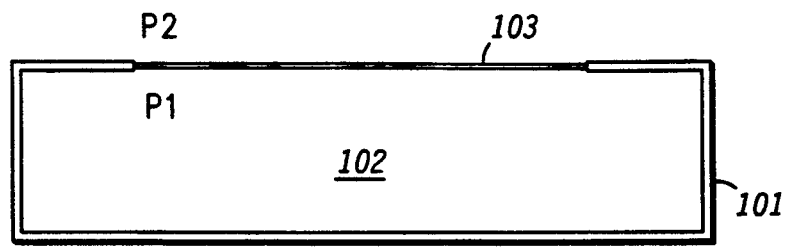
FIGS. 1A–1C are side-elevational cross-sectional depictions of sealed structures employing flexible members.
Figure 1B:
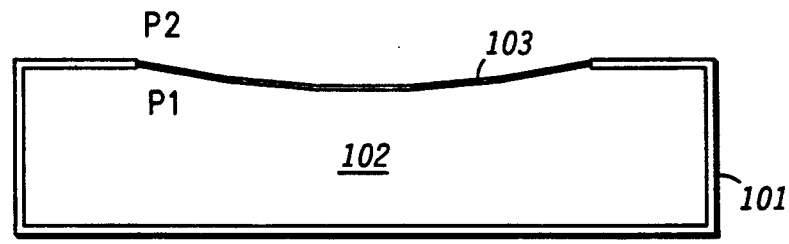
Figure 1C:
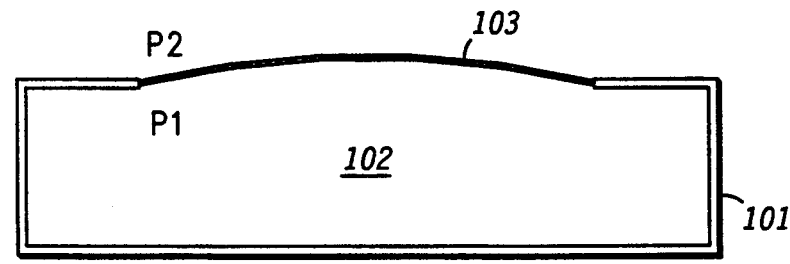

FIGS. 1A–1C illustrate a series of side-elevational cross-sectional depictions of sealed structures wherein each sealed structure is comprised of a substantially rigid container 101 and a flexible membrane 103 which flexible membrane 103 and rigid container 101 forms an enclosure containing a volume 102 at an internal pressure, P1.

FIG. 1A further depicts the orientation of the structure under the condition that the external pressure, P2, is equal to the internal pressure, P1, of the enclosed volume 102. Under these conditions the flexible membrane 103 remains in an undeflected position.

FIG. 1B illustrates the effects on the structure as external pressure is increased. When the external pressure, P2, exceeds the internal pressure, P1, there will exist a net inward force on the outer surfaces of the structure enclosing the volume 102 due to pressure differential. The rigid container 101 portion of the enclosure, suitably constructed, will withstand the force. However, the flexible membrane 103 will deflect, responsive to the pressure differential, in an attempt to minimize the net inward force by means of pressure equalization. As shown, for the pressure differential indicated above, the flexible membrane 103 will be deflected inward.

FIG. 1C depicts an orientation of the sealed structure when the external pressure, P2, is lower than the internal pressure, P1, resulting in a net outward force being exerted on inner surfaces of the structure enclosing the volume 102. In this instance the flexible membrane 103 will deflect outward, as shown, in an attempt to minimize the net outward force through pressure equalization.

Figure 2:
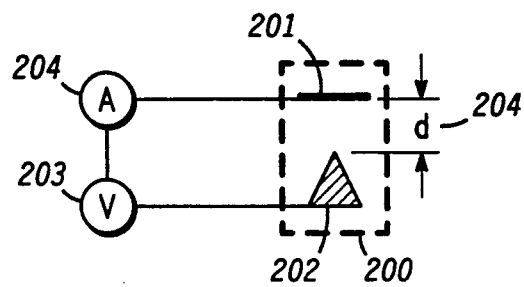
FIG. 2 provides a side-elevational cross-sectional depiction of an electron current device which may be employed to detect variations in differential pressure.

FIG. 2 illustrates a schematic representation of a pressure transducer device 200, comprising an emitter element 202 for emitting electron current and a flexible differential pressure detector 201. An external voltage source 203 may be applied to establish an electric field between the flexible differential pressure detector 201 and the emitter element 202, thus initiating a predetermined electron current flow from the emitter element 202. A level of electron current flow is determined in part by a magnitude of a potential applied by the external voltage source 203, and also by a distance, d, between the emitter element 202 and the flexible differential pressure detector 201. For the representation depicted, the electron current flow is monitored by inserting an ammeter 204 into a selected conductive path location. Alternate monitoring schemes may be employed that will conveniently translate the magnitude of the electron current flow to other suitable current levels or voltages.

The device of FIG. 2 operates in a quiescent state until at least one of: voltage applied by the external voltage source 203 is varied, and the distance 204 between the pressure transducer device 200 elements is varied. If, for example, the distance d between the flexible differential pressure detector 201 and the emitter element 202 is decreased, an electric field that exists between the flexible differential pressure detector 201 and the emitter element 201 will increase, giving rise to an increased electron current flow. Such an increase in electron current is detected by selected electron current monitoring circuitry incorporated into the system, such as an ammeter 204. Correspondingly, if the distance, d, between the flexible differential pressure detector 201 and the emitter element 202 is increased, the electric field that exists between the flexible differential pressure detector 201 and the emitter element 202 will decrease, giving rise to a decreased electron current flow. Again, a decrease in electron current is detected by selected electron current monitoring circuitry incorporated into the system, such as an ammeter 204. Clearly, detection of a change in electron current flow may substantially be related to a variation in position of the flexible differential pressure detector 201. Useful structures incorporating the above-described functional features are described below.

Figure 3A:
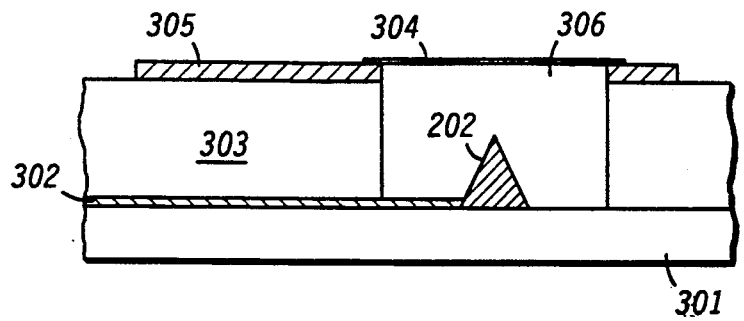
FIGS. 3A–3C are side elevational cross-sectional depictions of a first embodiment of a differential pressure transducer constructed in accordance with the present invention.
Figure 3B:
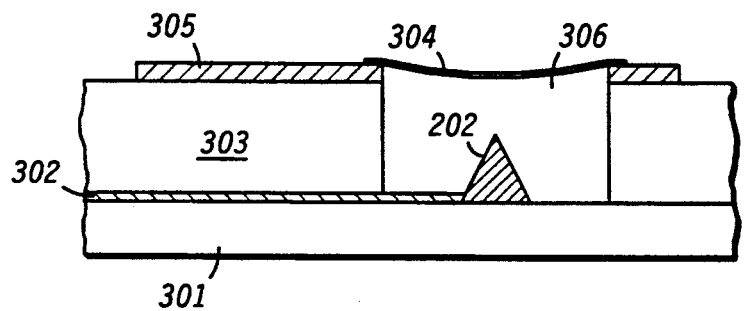
Figure 3C:
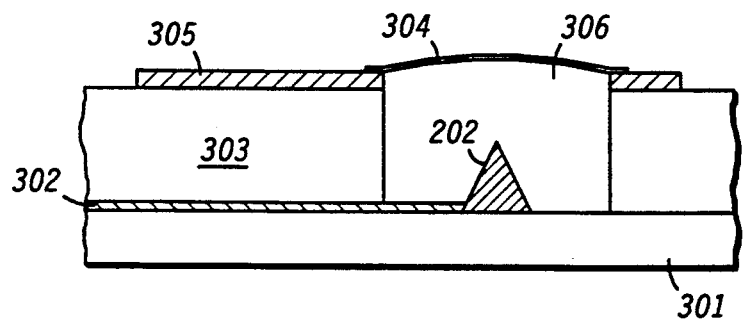

FIGS. 3A–3C are side-elevational cross-sectional depictions of structures employing a first embodiment of the present invention. FIG. 3A illustrates a supporting substrate 301 having at least a first major surface, on which is deposited at least a first conductive path 302. Alternatively, the at least first conductive path 302 may be realized as a selective implantation, wherein the supporting substrate 301 is a semiconductor substrate configured such that the at least first conductive path 302 is disposed in the supporting substrate 301. Subsequent to deposition of the at least first conductive path 302, a layer of insulating material 303, having at least first, second, and third surfaces, is deposited such that at least a part of the first surface is substantially disposed on at least a part of the at least first conductive path 302, and may be further deposited such that a remaining part of the first surface is disposed onto at least a part of an uncovered part of the at least first major surface of the supporting substrate 301. At least a second conductive path 305 is disposed on at least a part of the second surface of the at least first, second, and third surfaces of the layer of insulating material 303. A region 306 is shown substantially surrounded by the third surface of the at least first, second, and third surfaces of the layer of insulating material 303 and is a repository of at least a first emitter element 202. The at least first emitter element 202 is disposed at least partially on the at least first and conductive path 302. A flexible differential pressure detector 304 is distally disposed with respect to the at least first emitter element 202, and is operably coupled to the at least second conductive path 305.

In the embodiment shown by the cross-sectional depiction of FIG. 3A, the at least second conductive path 305 substantially traverses an entire periphery of the region 306, providing a basis for a thermal seal (bonding) to be made between the at least second conductive path 305 and the flexible differential pressure detector 304 substantially about the entire periphery of the region 306. Such sealing techniques are commonly employed in the art, and include, for example, metallic sealing materials. Alternate sealing methods may be employed, particularly in instances where other methods may be utilized to operably connect the flexible differential pressure detector 304 to the at least second conductive path 305. Such alternate sealing methods, as known in the art, may include, for example, glass frit seals.

The embodiment of the present invention includes at least a first sealed region 306 with a pre-selected pressure level. A pressure differential between a pressure of the sealed region 306 and an exterior pressure on the device will result in a net force being exerted on either interior or exterior surfaces of the structure that comprises the enclosure of the region 306. FIG. 3A illustrates an environment wherein the pressure differential is zero, and hence, there exists no net force on the surfaces of the structure. With no net force on the surfaces of the structure, the flexible differential pressure detector 304 will remain in a neutral position, as depicted in FIG. 3A, and the electron current flow from the emitter element 202 will be as prescribed by an applied external voltage (not shown) and the distance between the flexible differential pressure detector 304 and the emitter element 202.

FIG. 3B depicts a side elevational cross-sectional representation of a pressure transducer device similar to that described previously with reference to FIG. 3A. FIG. 3B further depicts the flexible differential pressure detector 304 being deflected inward, effectively reducing a volume of the enclosed region 306. This situation will be exhibited when the external pressure exceeds the pressure of the enclosed region 306. When deflected, the flexible differential pressure detector 304 is disposed more closely to the emitter element 202 than in the quiescent state, providing an increase in electron current flow from the emitter element 202 as a result of an increase in the electric field between the flexible differential pressure transducer 304 and the emitter element 202. The increased electron current flow is subsequently detected at the externally provided monitoring circuitry as described previously, and is translated into a desired electrical form, such as an error current or error voltage.

FIG. 3C depicts a side elevational cross-sectional representation of a pressure transducer device similar to that described previously with reference to FIG. 3A. FIG. 3C further depicts the flexible differential pressure detector 304 being deflected outward, effectively increasing the volume of the enclosed region 306. This situation will be exhibited when the external pressure is less than the pressure of the enclosed region 306. When deflected, the flexible differential pressure detector 304 is disposed more distantly from the emitter element 202 than in the quiescent state, providing a decrease in electron current flow from the emitter element 202 as a result of a decrease in the electric field between the flexible differential pressure transducer 304 and the emitter element 202. The decreased electron current flow is subsequently detected at externally provided monitoring circuitry, as described previously, and is translated into a desired electrical form, such as an error current or error voltage.

The flexible differential pressure detector 304 may be realized by a number of methods known in the art. For example, a first realization may employ a metallic layer of prescribed thickness to provide a desired deflection in accordance with a corresponding pressure differential. Another realization may employ a metallized layer disposed on a supporting substrate of prescribed thickness. Clearly, other realizations may be anticipated that employ materials providing the desired deflections.

Figure 4A:
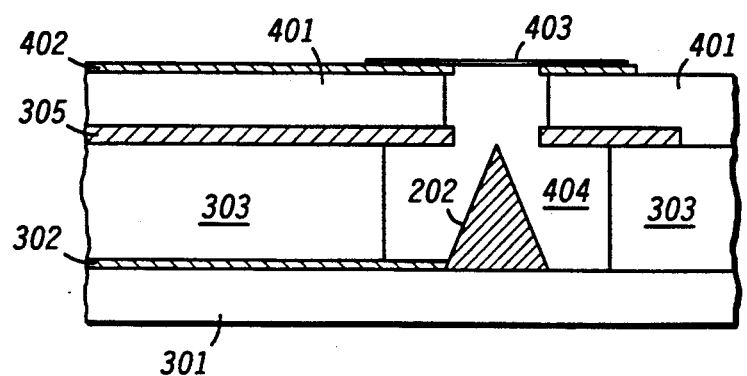
FIGS. 4A–4B are side-elevational cross-sectional depictions of a second and a third, respectively, embodiment of a differential pressure transducer constructed in accordance with the present invention.

FIG. 4A illustrates a side elevational cross-sectional depiction of a second embodiment of a pressure transducer device in accordance with the present invention. FIG. 4A depicts a device similar to that described previously with respect to FIG. 3A, and that is further comprised of at least a second layer of insulating material 401 having at least first, second, and third surfaces, wherein the first surface of the second layer of insulating material 401 is substantially disposed on at least a part of the at least second conductive path 305, and that may be further disposed on part of an uncovered part of the second surface of the at least first second, and third surfaces of the at least first layer of insulating material 303. There is also depicted an at least third conductive path 402 that is disposed on at least a part of the second surface of the at least first, second, and third surfaces of the at least second layer of insulating material 401. In this embodiment a differential pressure detector 403 is disposed distally with respect to the emitter element 202, is operably coupled to the at least third conductive path 305, and further, may be inflexible in contrast to the flexible differential pressure detector 304 provided in previous embodiments. The region 404 enclosed by the structure is partially defined by the third surface of the first, second, and third surfaces of the at least first layer of insulating material 303 and the third surface of the at least first, second, and third surfaces of the at least second layer of insulating material 401. In this embodiment construction of the device provides an entire structure that is successively disposed upon the second surface of the at least first, second, and third surfaces of the at least first layer of insulating material 303, being at least partially cantilevered such that it extends beyond the boundary formed by the third surface of the at least first, second, and third surfaces of the at least first layer of insulating material 303. Further, thicknesses of a sub-structure comprising the at least second conductive path 305, the at least second layer of insulating material 401, the at least third conductive path 402, and the differential pressure detector 403 are predetermined to provide for a prescribed deflection of the entire sub-structure in an environment that results in a pressure differential between the interior of the device and the exterior.

In one embodiment a first externally provided voltage source is applied between the at least first conductive path 302 and the at least second conductive path 305, and a second externally provided voltage source is applied between the at least first conductive path 302 and the at least third conductive path 402. In this embodiment the proximity of the at least second conductive path 305 to the emitter element 202 dictates electron current flow from the emitter element 202, while the differential pressure detector 403 will continue to receive substantially all of the electron current flow, as with the device described previously.

Figure 4B:
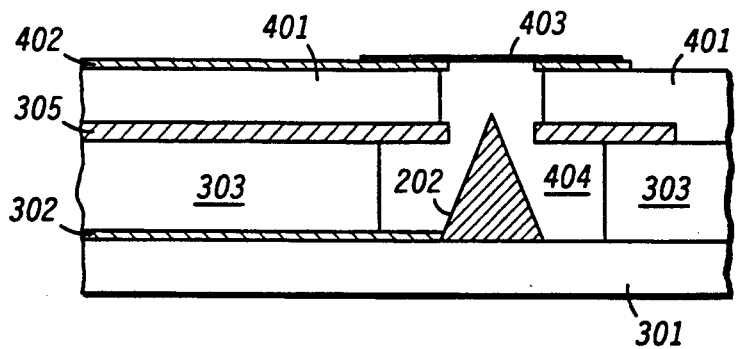

FIG. 4B illustrates a side elevational cross-sectional depiction of a third embodiment of a pressure transducer device of the present invention similar to that described previously with respect to FIG. 4A, with the noted exception that the thickness of the at least first layer of insulating material 303 is less than that of the device described in FIG. 4A, thus providing that the at least second layer of insulating material 401 is disposed below an apex of the emitter element 202. This allows the device of FIG. 4B to provide increased sensitivity to external environments of reduced pressure relative to the pressure of the enclosed region 404, whereas the disposition of the at least second conductive path 305 of FIG. 4A allows the device of FIG. 4A to provide an increased sensitivity to environments wherein the external pressure is greater than the pressure of the enclosed region 404.

Figure 5:
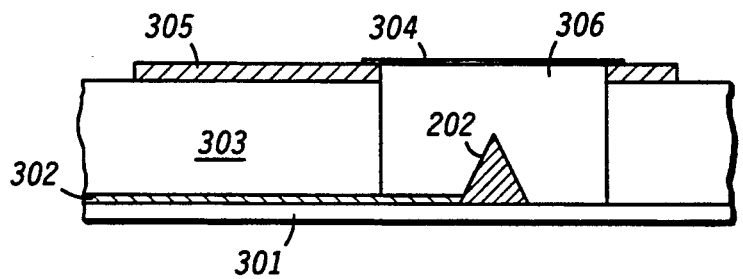
FIG. 5 is a side-elevational cross-sectional depiction of a fourth embodiment of a differential pressure transducer constructed in accordance with the present invention.

FIG. 5 depicts a side elevational cross-sectional representation of a fourth embodiment of a pressure transducer device of the present invention that is similar to that described previously with reference to FIG. 3A, and further wherein the supporting substrate 301 is of a reduced thickness in order to provide at least part of a desired deflection. Deflection of the supporting substrate 301 will result in a corresponding variation in the distance between the differential pressure detector 403 and the emitter element 202, with attendant variation in electron current flow. So constructed, the differential pressure detector 403 may be flexible and contribute to the total differential deflection, or, alternatively, it may be inflexible, such that the total deflection will be provided by the reduced thickness of the supporting substrate 301.

Figure 6:
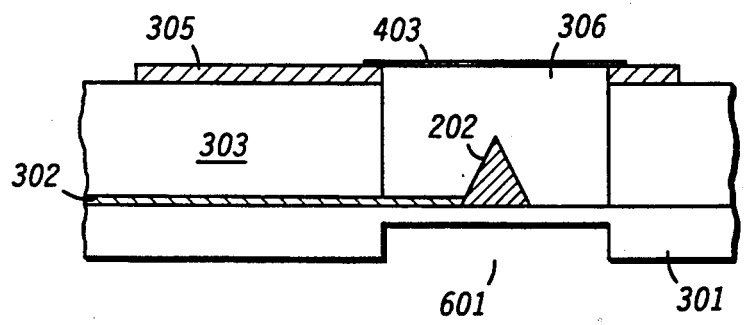
FIG. 6 is a side-elevational cross-sectional depiction of a fifth embodiment of a differential pressure transducer constructed in accordance with the present invention.

FIG. 6 depicts a side elevational cross-sectional depiction of a fifth embodiment of a pressure transducer device of the present invention similar to that described previously with respect to FIG. 3A, further including a supporting substrate 301 that has been selectively reduced in thickness in an area 601 substantially proximal to the enclosed region 306 of the device. So constructed, the pressure transducer device will function as described previously with reference to FIG. 5.

Figure 7:
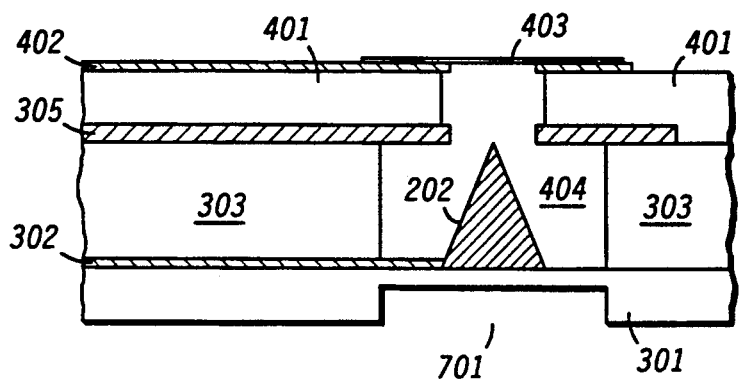
FIG. 7 is a side-elevational cross-sectional depiction of a sixth embodiment of a differential pressure transducer constructed in accordance with the present invention.

FIG. 7 illustrates a side elevational cross-sectional representation of a sixth embodiment of a pressure transducer device of the present invention similar to that described previously with reference to FIG. 4A, further including a supporting substrate 301 that has been selectively reduced in thickness in an area 701 substantially proximal to the enclosed region 404 of the device. So constructed, the pressure transducer device will function as described previously with reference to FIG. 4A and FIG. 5.

Other embodiments of pressure transducer devices employing the concepts of the present invention are anticipated wherein the structures may employ additional layers of insulators and/or conductive materials. Clearly variations to the geometric forms depicted may be made without departing from the present invention. Accordingly, it is intended that all such alterations and modifications be included within the spirit and scope of the invention as described in the appended claims.

We claim:

1. A pressure transducer device comprising:
   A) a supporting substrate having at least a first major surface;
   B) at least a first conductive path substantially disposed on at least a part of the at least first major surface of the supporting substrate;
   C) a first layer of insulating material having at least first, second, and third surfaces wherein the first surface of the at least first, second, and third surfaces of the insulating material is disposed on at least a part of any uncovered part of the at least first major surface of the supporting substrate and wherein the third surface of the at least first, second, and third surfaces substantially forms a boundary around at least a first region, which region is void of insulating material;
   D) at least a first emitter element, for emitting electrons, substantially symmetrically disposed in the at least first region of the first layer of insulating material void of insulating material and operably coupled to the at least first conductive path;
   E) at least a second conductive path substantially disposed on at least a part of the second surface of the at least first, second, and third surfaces of the first layer of insulating material and substantially symmetrically disposed about at least part of the boundary of the at least first region and at least partially extending, in a cantilevered manner, beyond the boundary of the at least first region;
   F) at least a second layer of insulating material having at least first and second surfaces wherein the first surface of the at least first and second surfaces is substantially disposed on at least a part of an uncovered part of the at least second surface of the at least first, second, and third surfaces of the first layer of insulating material and further disposed on at least a part of the at least second conductive path;
   G) at least a third conductive path substantially disposed on at least a part of the second surface of the at least first and second surfaces of the second layer of insulating material;
   H) a flexible differential pressure detector distally disposed with respect to the at least first emitter element and operably coupled to the at least a third conductive path and further disposed such that the flexible differential pressure detector and seals covers the at least first region void of insulating material;
   I) a first potential source operably coupled to the at least a first conductive path and the at least a second conductive path; and
   J) at least a second potential source operably coupled to the at least a first conductive path and the at least a third conductive path,
   wherein the flexible differential pressure detector in concert with the cantilevered portion of the second conductive path may translate variations in pressure differential between the exterior and the interior of the sealed device into corresponding variations in electron current due to the variation in deflection of the flexible differential pressure detector electrode which results in a variation in proximity of the flexible differential pressure detector to the emitter element.

2. The pressure transducer device of claim 1, wherein at least a part of the supporting substrate provides for at least some deflection of the emitter element indirectly disposed thereon by means of the existence of a pressure differential existing between the exterior of the device and the sealed region.

3. A pressure transducer device comprising:
   A) a supporting substrate having at least a first major surface and at least an area of reduced thickness;
   B) at least a first conductive path substantially disposed on at least a part of the at least first major surface of the supporting substrate;
   C) a first layer of insulating material having at least first, second, and third surfaces wherein the first surface of the at least first, second, and third surfaces of the insulating material is disposed on at least a part of any uncovered part of the at least first major surface of the supporting substrate and wherein the third surface of the at least first, second, and third surfaces substantially forms a boundary around at least first region which region is void of insulating material and wherein the region so formed is substantially proximally disposed with respect to the at least an area of reduced thickness of the supporting substrate;
   D) at least a first emitter element, for emitting electrons, substantially symmetrically disposed in the at least first region of the first layer of insulating material void of insulating material and operably coupled to the at least first conductive path;
   E) at least a second conductive path substantially disposed on at least a part of the second surface of the at least first, second, and third surfaces of the first layer of insulating material and substantially symmetrically disposed about at least part of the boundary of the at least first region and at least partially extending, in a cantilevered manner, beyond the boundary of the at least first region;

F) at least a second layer of insulating material having at least first and second surfaces wherein the first surface of the at least first and second surfaces is substantially disposed on at least a part of an uncovered part of the at least second surface of the at least first, second, and third surfaces of the first layer of insulating material and further disposed on at least a part of the at least second conductive path;

G) at least a third conductive path substantially disposed on at least a part of the second surface of the at least first and second surfaces of the second layer of insulating material; and H) a differential pressure detector distally disposed with respect to the at least first emitter element and operably coupled to the at least a third conductive path and further disposed such that the flexible differential pressure detector and seals covers the at least first region void of insulating material;

I) a first potential source operably coupled to the at least a first conductive path and the at least a second conductive path; and J) at least a second potential source operably coupled to the at least a first conductive path and the at least a third conductive path;

wherein the differential pressure detector in concert with the cantilevered portion of the second conductive path may translate variations in pressure differential between the exterior and the interior of the sealed device into corresponding variations in electron current due to the variation in deflection of the flexible supporting substrate area of reduced thickness which results in a variation in proximity of the differential pressure detector to the emitter element.

4. A pressure transducer comprising:
a field emission device including an emitter mounted on a first layer of conductive material and an anode mounted on a second layer of conductive material spaced from the first layer;
a third layer of conductive material positioned between the first and second layers and spaced from the emitter and the anode, an edge of the third layer being spaced from the emitter for dictating current flow from the emitter to the anode when properly energized;
an insulating layer positioned between the first layer and the third layer and between the second layer and the third layer and defining in conjunction with the anode and the first and second layers of material a sealed region surrounding the emitter and defining an interior and an exterior; and
one of the emitter and the edge of the third layer being flexibly mounted to provide variations in the spacing between the emitter and the edge of the third layer when a pressure differential between the exterior and the interior of the sealed region is applied.

5. A pressure transducer as claimed in claim 4 wherein the emitter is formed with a tip for emitting electrons and the edge of the third layer lies in a plane with the tip.

6. A pressure transducer as claimed in claim 4 wherein the emitter is formed with a tip for emitting electrons and the tip lies in a plane positioned between the edge of the third layer and the anode.

7. A pressure transducer as claimed in claim 4 including in addition a substrate with the first layer being mounted on the substrate, the substrate having a reduced thickness adjacent the emitter to provide a flexible mounting for the emitter.

8. A pressure transducer as claimed in claim 4 wherein the insulating layer between the first layer and the third layer defines a portion of the sealed region which is larger than a portion of the sealed region defined by the insulating layer between the second layer and the third layer so that the edge of the third layer adjacent the emitter is cantilevered for movement relative to the emitter in response to a pressure differential between the exterior and the interior of the sealed region.

9. A pressure transducer as claimed in claim 8 including in addition a substrate with the first layer being mounted on the substrate, the substrate having a reduced thickness adjacent the emitter to provide a flexible mounting for the emitter.

* * * * *